(12) United States Patent
Masuda

(10) Patent No.: US 12,489,954 B2
(45) Date of Patent: Dec. 2, 2025

(54) SERVER, METHOD, AND TERMINAL

(71) Applicant: 17LIVE Japan Inc., Tokyo (JP)

(72) Inventor: Ryoya Masuda, Tokyo (JP)

(73) Assignee: 17LIVE JAPAN INC., Tokyo (JP)

( * ) Notice: Subject to any disclaimer, the term of this patent is extended or adjusted under 35 U.S.C. 154(b) by 164 days.

(21) Appl. No.: 18/452,359

(22) Filed: Aug. 18, 2023

(65) Prior Publication Data

US 2024/0236433 A1     Jul. 11, 2024

(30) Foreign Application Priority Data

Jan. 10, 2023    (JP) ................................ 2023-001832

(51) Int. Cl.
    *H04N 21/478*      (2011.01)
    *H04N 21/2187*     (2011.01)
    *H04N 21/239*      (2011.01)

(52) U.S. Cl.
    CPC ..... *H04N 21/4781* (2013.01); *H04N 21/2187* (2013.01); *H04N 21/2393* (2013.01)

(58) Field of Classification Search
    CPC ........... H04N 21/2187; H04N 21/4781; H04N 21/4784; H04N 21/4788
    See application file for complete search history.

(56) References Cited

U.S. PATENT DOCUMENTS

2016/0310843 A1* 10/2016 Webb ...................... A63F 13/85
2020/0143447 A1* 5/2020 Wang ................. G06Q 30/0212
2021/0279759 A1* 9/2021 Lee ..................... G06Q 30/0235
2022/0086511 A1* 3/2022 Laakkonen ......... G07F 17/3225
2022/0159314 A1* 5/2022 Silberman-Sais ..........................
                                                                  H04N 21/6405
2024/0080504 A1* 3/2024 Xu ..................... H04N 21/2187

FOREIGN PATENT DOCUMENTS

JP       2022-521348 A     4/2022

OTHER PUBLICATIONS

English Translation of Chinese application 202211078115.3 (Year: 2022).*
Fayblog, "How to earn diamonds in Uplive! accompanied by hints on mini-games!", May 2023, with English translation (41 pgs.), URL:https://fayevery.blog/uplive-diamond#index_id6.
Nikkei XTREND, " 'live games' promised to be big hits in 2023: Mirativ digs a new vein", Dec. 2022, with English translation (21 pgs.), URL:https://xtrend.nikkei.com/atcl/contents/18/00745/00002/.

* cited by examiner

*Primary Examiner* — Jason Salce
(74) *Attorney, Agent, or Firm* — Muncy, Geissler, Olds & Lowe, P.C.

(57) ABSTRACT

Provided is a server configured to provide a game that is playable in a livestream and involves gaining or losing points. The server includes: a relay unit adapted to transmit a video data related to the livestream from a terminal of a live-streamer to a terminal of a viewer; a receiving unit adapted to receive a start request for the game from the terminal of the viewer over a network; and a starting unit adapted to start to provide the game in the livestream to the terminal of the viewer in response to reception of the start request, the game having a gain-loss setting corresponding to the live-streamer of the livestream.

13 Claims, 14 Drawing Sheets

| Stream ID | Live-streamer ID | Viewer ID |
|---|---|---|
| ST22 | ABC | USR1, USR2, ... |
| ST92 | DEF | USR5, USR6, ... |

| User ID | Points | Reward |
|---|---|---|
| ABC | 3243 | 1500 |
| DEF | 2510 | 800 |
| USR1 | 1803 | 0 |
| USR2 | 1305 | 0 |

| Gift ID | Granted Reward | Price Points |
|---|---|---|
| TT01 | 90 | 100 |
| TE01 | 180 | 200 |

| Live-streamer ID | Normal/Special |
|---|---|
| ABC | Normal |
| DEF | Special |

SERVER, METHOD, AND TERMINAL

CROSS-REFERENCE TO RELATED APPLICATIONS

This application is based on and claims the benefit of priority from Japanese Patent Application Serial No. 2023-1832 (filed on Jan. 10, 2023), the contents of which are hereby incorporated by reference in its entirety.

TECHNICAL FIELD

The present disclosure relates to a server, a method, and a terminal.

BACKGROUND

With the development of IT technology, the way information is exchanged has changed. In the Showa period (1926-1989), one-way information communication via newspapers and television was the main stream. In the Heisei period (1990-2019), with the widespread availability of cell phones and personal computers, and the significant improvement in Internet communication speed, instantaneous interactive communication services such as chat services emerged, and on-demand video streaming services also became popular as storage costs were reduced.

Nowadays or in the Reiwa period (2019 to present), with the sophistication of smartphones and further improvements in network speed as typified by 5G, services that enable real-time communication through video, especially live-streaming services, are gaining recognition. The number of users of live-streaming services is expanding, especially among young people, as such services allow people to share the same good time even when they are in the separate locations from each other.

To encourage people to view a live-stream, a game(s) that can be played in the livestream may be provided (see, for example, FayBlog, "How to earn diamonds in Uplive! accompanied by hints on mini-games!" URL:https://fayevery.blog/uplive-diamond #index_id6 ("the non-patent literature 1"), and Nikkei XTREND, "'live games' promised to be big hits in 2023: Mirativ digs a new vein", Dec. 5, 2022, URL:https://xtrend.nikkei.com/atcl/contents/18/00745/00002/("the non-patent literature 2").

Some measures on operation of live-streaming platforms include promoting predetermined live-streamers or livestreams and giving preference a predetermined viewer(s) over other viewers. It is desired to provide a new mechanism for this purpose.

SUMMARY

The present disclosure is made in view of the above, and one object is to provide techniques for promoting a predetermined live-streamer or livestream or for giving preference a predetermined viewer(s) over other viewers.

One aspect of the disclosure relates to a server. The server configured to provide a game that is playable in a livestream and involves gaining or losing points. The server includes: a relay unit adapted to transmit a video data related to a livestream from a terminal of a live-streamer to a terminal of a viewer; a receiving unit adapted to receive a start request for a game from the terminal of the viewer over a network; and a starting unit adapted to start to provide the game in the livestream to the terminal of the viewer in response to reception of the start request, the game having a gain-loss setting corresponding to the live-streamer of the livestream.

Another aspect of the disclosure relates to a terminal. The terminal includes one or more processors, and memory storing one or more computer programs configured to be executed by the one or more processors. The one or more computer programs includes instructions for: communicating over a network with a server configured to provide a game, the game being playable in a livestream and involving gaining or losing points; and receiving, from the server over the network, a list of available live-streams including a first live-stream associated with a game having a first gain-loss setting and a second live-stream associated with a game having a second gain-loss setting different from the first gain-loss setting; and displaying objects representing the livestreams included in the list on a display, wherein an object representing the first livestream is displayed in a different style from that of an object representing the second livestream.

It should be noted that the components described throughout this disclosure may be interchanged or combined. The components, features, and expressions described above may be replaced by devices, methods, systems, computer programs, recording media containing computer programs, etc. Any such modifications are intended to be included within the spirit and scope of the present disclosure.

Advantageous Effects

According to the aspects of the disclosure, it is possible to promote a predetermined live-streamer or livestream or give preference a predetermined viewer over other viewers.

BRIEF DESCRIPTION OF THE DRAWINGS

FIG. 4 is a data structure diagram showing, as an example, a stream DB shown in FIG. 3.

FIG. 5 is a data structure diagram showing, as an example, a user DB shown in FIG. 3.

FIG. 6 is a data structure diagram showing, as an example, a gift DB shown in FIG. 3.

FIG. 7 is a data structure diagram showing, as an example, an allocation DB shown in FIG. 3.

DESCRIPTION OF THE EMBODIMENTS

Like elements, components, processes, and signals throughout the figures are labeled with same or similar designations and numbering, and the description for the like elements will not be hereunder repeated. For purposes of clarity and brevity, some of the components that are less related and thus not described are not shown in the figures.

A live-streaming system according to an embodiment provides, to viewers of a livestream, a game playable in the livestream and in which players gain or lose points (hereinafter simply referred to as "game"). The game has a gain-loss setting for each live-streamer. In other words, viewers may have different gain-loss settings for the game depending on live-streamers whom the viewers watch. The gain-loss setting includes a multiplier, a win rate, etc., and is characterized by an expected value of the points returned as a result of the game. In the embodiment, for a predetermined live-streamer, a special gain-loss setting that is more advantageous to his/her viewers to gain or lose points than normal gain-loss settings is associated. For example, the expected value of the special gain-loss setting is set higher than those of the normal gain-loss settings. By adjusting the advantage of the game depending on the live-streamers in this way, the game can be varied and the excitement of the game is increased. It is also possible to promote a particular live-streamer.

Figure 1:
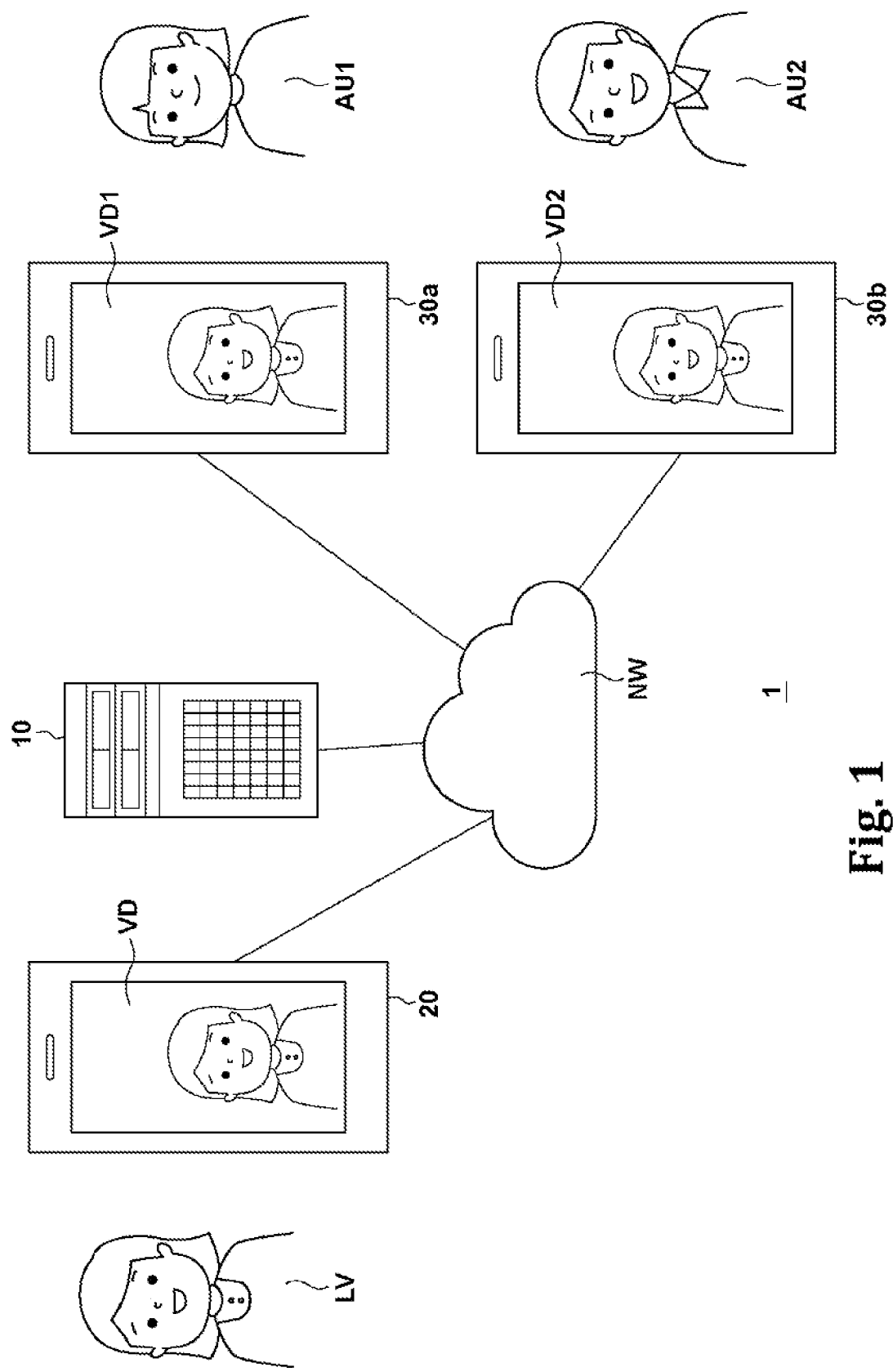
FIG. 1 schematically illustrates a configuration of a live-streaming system according to one embodiment of the disclosure.

FIG. 1 schematically illustrates the configuration of a live-streaming system 1 according one embodiment of the disclosure. The live-streaming system 1 provides an interactive live-streaming service that allows a live-streamer LV (also referred to as a liver or streamer) and a viewer AU (also referred to as audience) (AU1, AU2 . . . ) to communicate in real time. As shown in FIG. 1, the live-streaming system 1 includes a server 10, a user terminal 20 on the live-streamer side, and user terminals 30 (30a, 30b,) on the audience side. In addition to the live-streamer who is live-streaming and the viewers who watch the live-stream, there may be users who have logged in the live-streaming platform but is neither live-streaming nor watching the livestream. Such users are referred to as active users. The live-streamer, the viewers, and the active users may be collectively referred to as users. The server 10 may be one or more information processing devices connected to a network NW. The user terminals 20 and 30 may be, for example, mobile terminal devices such as smartphones, tablets, laptop PCs, recorders, portable gaming devices, and wearable devices, or may be stationary devices such as desktop PCs. The server 10, the user terminal 20, and the user terminals 30 are interconnected so as to be able to communicate with each other over the various wired or wireless network NW. In the embodiment, the server 10 is configured to provide a game to the viewer's user terminal.

The live-streaming system 1 involves the live-streamer LV, the viewers AU, and an administrator (not shown) who manages the server 10. The live-streamer LV is a person who broadcasts contents in real time by recording the contents with his/her user terminal 20 and uploading them directly to the server 1. Examples of the contents may include the live-streamer's own songs, talks, performances, fortune-telling, gameplays, and any other contents. The administrator provides a platform for live-streaming contents on the server 10, and also mediates or manages real-time interactions between the live-streamer LV and the viewers AU. The viewers AU access the platform at their user terminals 30 to select and view a desired content. During live-streaming of the selected content, the viewers AU perform operations to comment and cheer via the user terminals 30, the live-streamer LV who is delivering the content responds to such a comment, cheer and request, and such response is transmitted to the viewers AU via video and/or audio, thereby establishing an interactive communication.

As used herein, the term "live-streaming" or "livestream" may mean a mode of data transmission that allows a content recorded at the user terminal 20 of the live-streamer LV to be played and viewed at the user terminals 30 of the viewers AU substantially in real time, or it may mean a live broadcast realized by such a mode of transmission. The live-streaming may be achieved using existing live-streaming technologies such as HTTP Live Streaming, Common Media Application Format, Web Real-Time Communications, Real-Time Messaging Protocol and MPEG DASH. The live-streaming includes a transmission mode in which, while the live-streamer LV is recording contents, the viewers AU can view the contents with a certain delay. The delay is acceptable as long as interaction between the live-streamer LV and the viewers AU can be at least established. Note that the live-streaming is distinguished from so-called on-demand type transmission, in which contents are entirely recorded and the entire data is once stored on the server, and the server provides users with the data at any subsequent time upon request from the users.

The term "video data" herein refers to data that includes image data (also referred to as moving image data) generated using an image capturing function of the user terminals 20 and 30 and audio data generated using an audio input function of the user terminals 20 and 30. Video data is reproduced in the user terminals 20 and 30, so that the users can view contents. In this embodiment, it is assumed that between video data generation at the live-streamer's user terminal and video data reproduction at the viewer's user terminal, processing is performed onto the video data to change its format, size, or specifications of the data, such as compression, decompression, encoding, decoding, or transcoding. However, such processing does not substantially change the content (e.g., video images and audios) represented by the video data, so that the video data after such processing is herein described as the same as the video data before such processing. In other words, when video data is generated at the live-streamer's user terminal and then played back at the viewer's user terminal via the server 10, the video data generated at the live-streamer's user terminal, the video data that passes through the server 10, and the video data received and reproduced at the viewer's user terminal are all the same video data.

As used herein, "livestream duration" is a parameter associated with a single livestream and refers to the length of time during which the livestream continues. The livestream duration is calculated irrespective of whether or not there are any viewers of the livestream. As used herein, "total live-streaming time" is a parameter associated with a live-streamer and is obtained by adding up the durations of livestreams performed by the live-streamer in a given period of time. As used herein, "view duration" is a parameter associated with a viewer-streamer pair and shows the amount of time the viewer has spent watching a livestream of the live-streamer. As used herein, "viewed duration" is a parameter associated with a live-streamer and shows the amount of time a viewer(s) has spent watching a livestream of the live-streamer. The viewer here may be a single randomly selected viewer, a subset of randomly selected viewers, or all viewers. Alternatively, the viewed duration may be an average value calculated for a plurality of viewers. The viewed duration is a metric showing how much of the livestream of the live-streamer is viewed by the viewer(s). As used herein, "total viewed time" is one form of the viewed duration, which is obtained by adding up the viewed durations for all viewers who viewed a livestream of the live-streamer during a given period.

For example, suppose that viewer B watched 2 hours, viewer C watched 3 hours, and viewer D watched 4 hours of a livestream of live-streamer A during a given period, the above metrics will be obtained as follows:

View duration of the viewer B=2 hours
View duration of the viewer C=3 hours
View duration of the viewer D=4 hours
Total viewed time of the livestream of the live-streamer A=2+3+4=9 hours
Average viewed time of the livestream of the live-streamer A=9/3=3 hours
Viewed duration of the livestream of the live-streamer A: It can be either the total viewed time or average viewed time.

In the example in FIG. 1, a live-streamer LV is live-streaming his/her talk. The user terminal 20 of the live-streamer LV generates video data by recording images and sounds of the live-streamer LV who is talking, and the generated data is transmitted to the server 10 over the network NW. At the same time, the user terminal 20 displays the recorded video image VD of the live-streamer LV on the display of the user terminal 20 to allow the live-streamer LV to check what is to be streamed.

The user terminals 30a and 30b of the viewers AU1 and AU2 respectively, who have requested the platform to enable them to view the livestream of the live-streamer LV, receive video data related to the livestream over the network NW and reproduce the received video data, to display video images VD1 and VD2 on the displays and output audio through the speakers. The video images VD1 and VD2 displayed at the user terminals 30a and 30b, respectively, are substantially the same as the video image VD captured by the user terminal 20 of the live-streamer LV, and the audio outputted at the user terminals 30a and 30b is substantially the same as the audio recorded by the user terminal 20 of the live-streamer LV.

Recording of the images and sounds at the user terminal 20 of the live-streamer LV and reproduction of the video data at the user terminals 30a and 30b of the viewers AU1 and AU2 are performed substantially simultaneously. The viewer AU1 may type a comment about the talk of the live-streamer LV on the user terminal 30a, and the server 10 may display the comment on the user terminal 20 of the live-streamer LV in real time and also display the comment on the user terminals 30a and 30b of the viewers AU1 and AU2, respectively. The live-streamer LV may read the comment and develop his/her talk to cover and respond to the comment, and the video and sound of the talk are output on the user terminals 30a and 30b of the viewers AU1 and AU2, respectively. This interactive action is recognized as establishment of a conversation between the live-streamer LV and the viewer AU1. In this way, the live-streaming system 1 realizes the live-streaming that enables the inter-active communication, not one-way communication.

Figure 2:
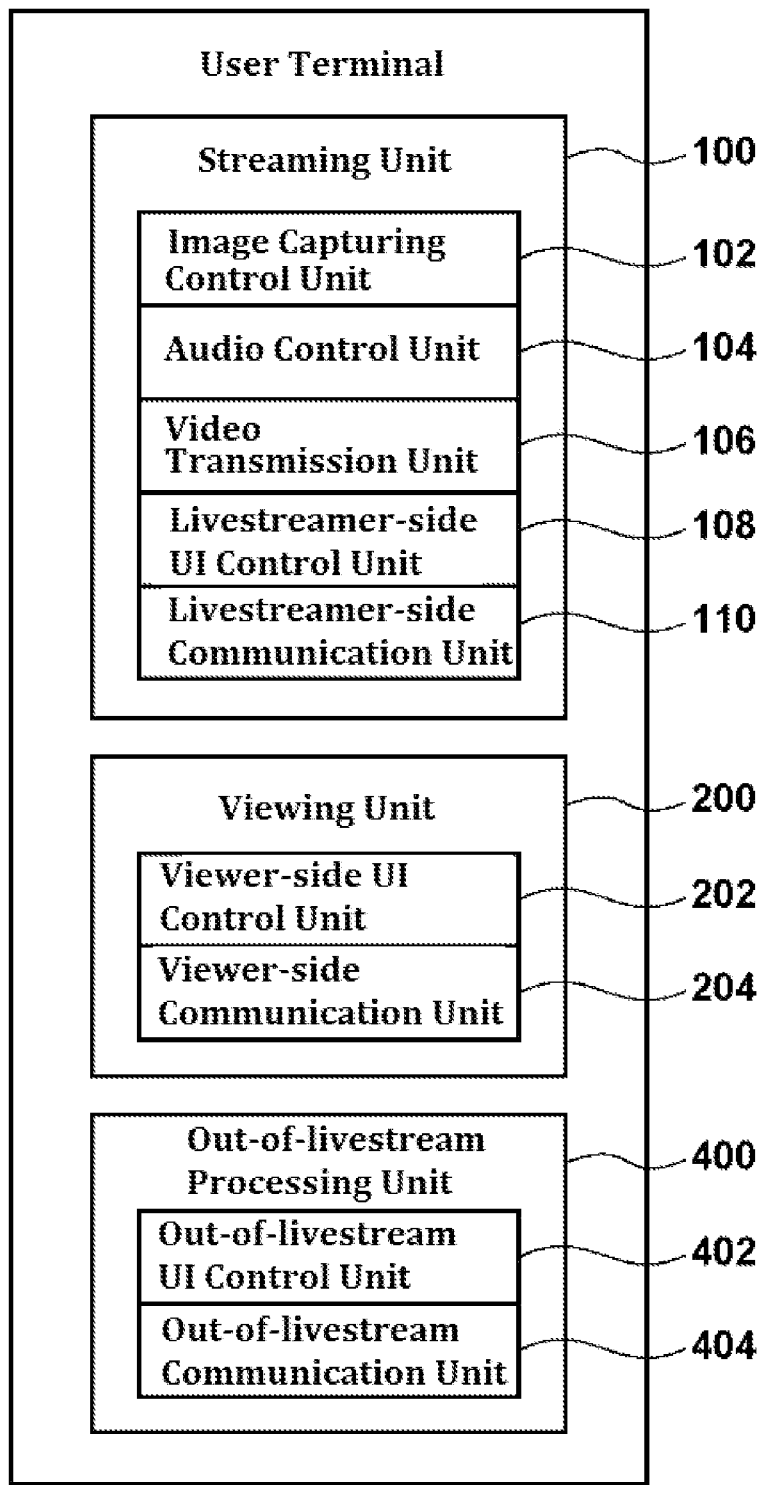
FIG. 2 is a block diagram showing functions and configuration of a user terminal of FIG. 1.

FIG. 2 is a block diagram showing functions and configuration of the user terminal 20 of FIG. 1. The user terminals 30 have the same functions and configuration as the user terminal 20. The blocks in FIG. 2 and the subsequent block diagrams may be realized by elements such as a computer CPU or a mechanical device in terms of hardware, and can be realized by a computer program or the like in terms of software. The blocks shown in the drawings are, however, functional blocks realized by cooperative operation between hardware and software. Therefore, it is understood by those skilled in the art that these functional blocks can be realized in various forms by combining hardware and software.

The live-streamer LV and the viewers AU download and install a live-streaming application program (hereinafter referred to as a live-streaming application), onto the user terminals 20 and 30 from a download site over the network NW. Alternatively, the live-streaming application may be pre-installed on the user terminals 20 and 30. When the live-streaming application is executed on the user terminals 20 and 30, the user terminals 20 and 30 communicate with the server 10 over the network NW to implement various functions. Hereinafter, the functions implemented by (processors such as CPUs of) the user terminals 20 and 30 by running the live-streaming application will be described as functions of the user terminals 20 and 30. These functions are realized in practice by the live-streaming application on the user terminals 20 and 30. In any other embodiments, these functions may be realized by a computer program written in a programming language such as HTML (HyperText Markup Language), which is transmitted from the server 10 to web browsers of the user terminals 20 and 30 over the network NW and executed by the web browsers.

The user terminal 20 includes a streaming unit 100 for generating a video data in which the user's image and sound are recorded and providing the video data to the server 10, a viewing unit 200 for acquiring and reproducing the video data from the server 10, and an out-of-livestream processing unit 400 for processing requests made by active users. The user activates the streaming unit 100 to live-stream, the viewing unit 200 to view a livestream, and the out-of-livestream processing unit 400 to look for a live-stream, view a live-streamer's profile, or watch an archive. The user terminal having the streaming unit 100 activated is the live-streamer's terminal, i.e., the user terminal that generates video data, the user terminal having the viewing unit 200 activated is the viewer's terminal, i.e., the user terminal that reproduces video data, and the user terminal having the out-of-livestream processing unit 400 activated is the active user's terminal.

The streaming unit 100 includes an image capturing control unit 102, an audio control unit 104, a video transmission unit 106, a streamer-side UI control unit 108, and a streamer-side communication unit 110. The image capturing control unit 102 is connected to a camera (not shown in FIG. 2) and controls image capturing performed by the camera. The image capturing control unit 102 obtains image data from the camera. The audio control unit 104 is connected to a microphone (not shown in FIG. 2) and controls audio input from the microphone. The audio control unit 104 obtains audio data through the microphone. The video transmission unit 106 transmits video data including the image data obtained by the image capturing control unit 102 and the audio data obtained by the audio control unit 104 to the server 10 over the network NW. The video data is transmitted by the video transmission unit 106 in real time. That is, the generation of the video data by the image capturing control unit 102 and the audio control unit 104, and the transmission of the generated video data by the video transmission unit 106 are performed substantially at the same time.

The streamer-side UI control unit 108 controls a UI for the live-streamer. The streamer-side UI control unit 108 is connected to a display (not shown in FIG. 2), and displays a video on the display by reproducing the video data that is to be transmitted by the video transmission unit 106. The streamer-side UI control unit 108 is also connected to input means (not shown in FIG. 2) such as touch panels, keyboards, and displays, and obtains the live-streamer's input via the input means. The streamer-side UI control unit 108 superimposes a predetermined frame image on the video image. The frame image includes various user interface objects (hereinafter simply referred to as "objects") for receiving inputs from the live-streamer, comments entered by the viewers, and information obtained from the server 10. The streamer-side UI control unit 108 receives, for example, the live-streamer's inputs made by the live-streamer tapping the objects.

The streamer-side communication unit 110 controls communication with the server 10 during a live-stream. The streamer-side communication unit 110 transmits the content of the live-streamer's input that has been obtained by the streamer-side UI control unit 108 to the server 10 over the network NW. The streamer-side communication unit 110 receives various information associated with the livestream from the server 10 over the network NW.

The viewing unit 200 includes a viewer-side UI control unit 202 and a viewer-side communication unit 204. The viewing-side communication unit 204 communicates with the server 10 via the network NW during live transmission. The viewer-side communication unit 204 receives, from the server 10 over the network NW, video data related to the livestream in which the live-streamer and the viewer participate.

The viewer-side UI control unit 202 controls the UI for the viewer. The viewer-side UI control unit 202 is connected to a display and a speaker (not shown in FIG. 2), and reproduces the received video data so that video images are displayed on the display and sounds are output through the speaker. The state where the images and sounds are respectively output through the display and speaker can be referred to as "the video data is reproduced". The viewer-side UI control unit 202 is also connected to input means (not shown in FIG. 2) such as touch panels, keyboards, and displays, and obtains viewer's input via the input means. The viewer-side UI control unit 202 superimposes a predetermined frame image on an image generated from the video data obtained from the server 10. The frame image includes various objects for receiving inputs from the viewer, comments entered by the viewer, information obtained from the server 10, and an object(s) related to a game provided in the live-stream. The viewer-side communication unit 204 transmits the content of the viewer's input that has been obtained by the viewer-side UI control unit 202 to the server 10 over the network NW.

The out-of-livestream processing unit 400 includes an out-of-livestream UI control unit 402 and an out-of-livestream communication unit 404. The out-of-livestream UI control unit 402 controls a UI for the active user. For example, the out-of-livestream UI control unit 402 generates a livestream selection screen and shows the screen on the display. The livestream selection screen presents a list of live-streams to which the active user is currently invited to participate to allow the active user to select a live stream. The out-of-livestream UI control unit 402 generates a profile screen for any user and shows the screen on the display. The out-of-livestream UI control unit 402 plays back an archived past live-stream, which is recorded and stored.

The out-of-livestream communication unit 404 controls communication with the server 10 that takes place outside a live-stream. The out-of-livestream communication unit 404 receives, from the server 10 over the network NW, information necessary to generate the livestream selection screen, information necessary to generate the profile screen, and archived data. The out-of-livestream communication unit 404 transmits the content of the active user's input to the server 10 over the network NW.

Figure 3:
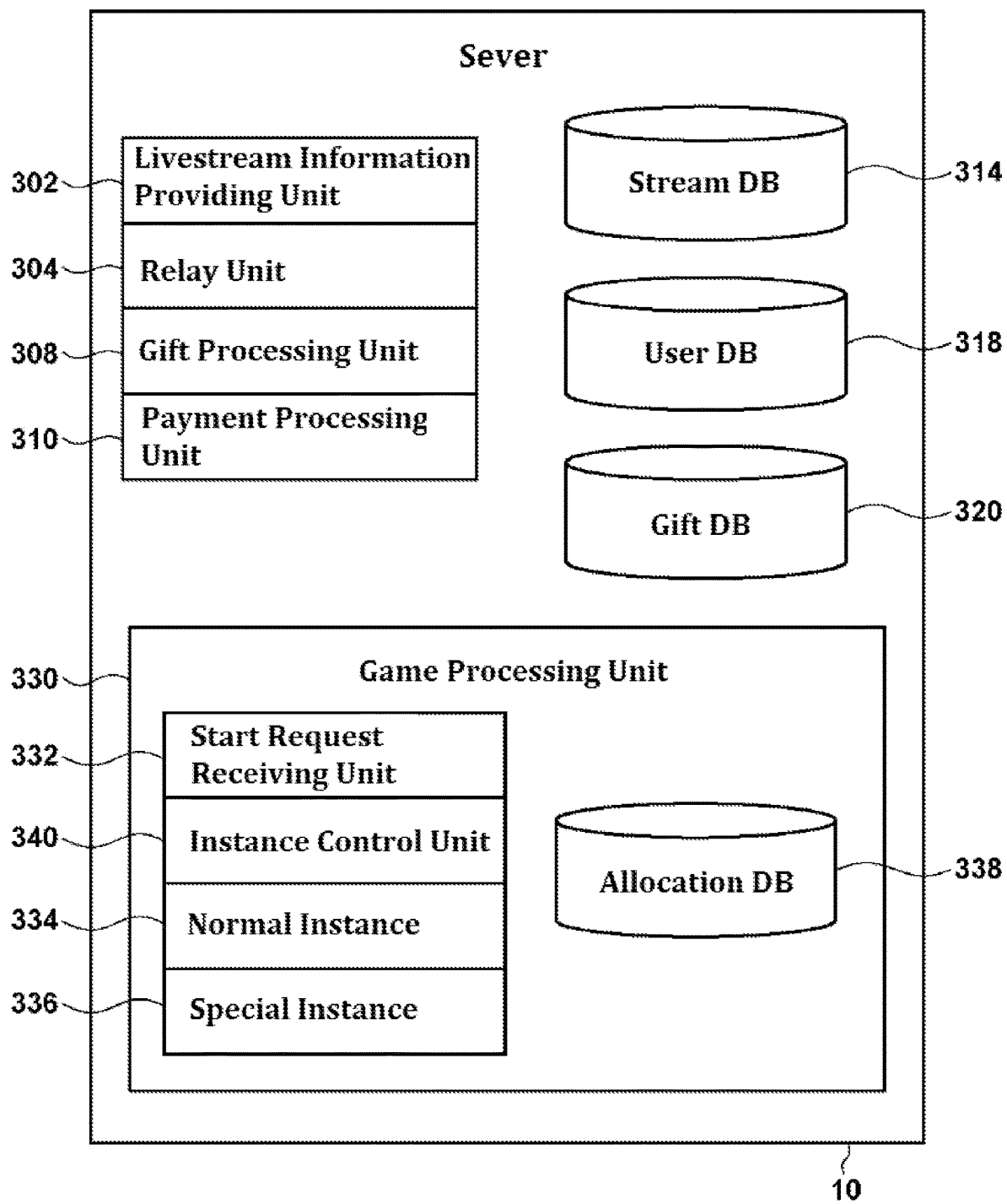
FIG. 3 is a block diagram showing functions and configuration of a server shown in FIG. 1.

FIG. 3 is a block diagram showing functions and configuration of the server 10 of FIG. 1. The server 10 includes a stream information providing unit 302, a relay unit 304, a gift processing unit 308, a payment processing unit 310, a game processing unit 330, a stream DB 314, a user DB 318, and a gift DB 322.

FIG. 4 is a data structure diagram showing an example of the stream DB 314 of FIG. 3. The stream DB 314 holds information regarding livestreams currently taking place. The stream DB 314 stores a stream ID identifying a livestream on a livestreaming platform provided by the livestreaming system 1, a live-streamer ID, which is a user ID identifying the live-streamer who provides the livestream, and a viewer ID, which is a user ID identifying a viewer of the livestream, in association with each other.

In the livestreaming platform provided by the livestreaming system 1 of the embodiment, when a user livestreams, the user is referred to as a live-streamer, and when the same user views a livestream streamed by another user, the user is referred to as a viewer. Therefore, the distinction between a live-streamer and a viewer is not fixed, and a user ID registered as a live-streamer ID at one time may be registered as a viewer ID at another time.

FIG. 5 is a data structure diagram showing an example of the user DB 318 of FIG. 3. The user DB 318 holds information regarding users. The user DB 318 stores a user ID identifying a user, points owned by the user, and the reward awarded to the user, in association with each other.

The points are an electronic representation of value circulated in the livestreaming platform. The user can purchase the points using a credit card or other means of payment. The reward is an electronic representation of value defined in the livestreaming platform and is used to determine the amount of money the live-streamer receives from the administrator of the livestreaming platform. In the livestreaming platform, when a viewer gives a gift to a live-streamer within or outside a livestream, the viewer's points are consumed and, at the same time, the live-streamer's reward is increased by a corresponding amount.

FIG. 6 is a data structure diagram showing an example of the gift DB 320 of FIG. 3. The gift DB 320 holds information regarding gifts available for the viewers in relation to the live-streaming. A gift is electronic data with the following characteristics:

- It can be purchased in exchange for the points or money, or can be given for free.
- It can be given by a viewer to a live-streamer. Giving a gift to a live-streamer is also referred to as using the gift or throwing the gift.
- Some gifts may be purchased and used at the same time, and some gifts may be used by the viewer at any time after purchased.
- When a viewer gives a gift to a live-streamer, the live-streamer is given a corresponding reward.

When a gift is used, the use may trigger an effect associated with the gift. For example, an effect corresponding to the gift will appear on the livestreaming room screen.

The gift DB 320 stores: a gift ID for identifying a gift; a reward to be awarded, which is a reward awarded to a live-streamer when the gift is given to the live-streamer; and price points, which is the amount of points to be paid for use of the gift, in association with each other. A viewer is able to give a desired gift to a live-streamer by paying the price points of the desired gift while viewing the livestream. The payment of the price points may be made by appropriate electronic payment means. For example, the payment may be made by the viewer paying the price points to the administrator. Alternatively, bank transfers or credit card payments may be available. The administrator is able to desirably set the relationship between the reward to be awarded and the price points. For example, it may be set as the reward to be awarded=the price points. Alternatively, points obtained by multiplying the reward to be awarded by a predetermined coefficient such as 1.2 may be set as the price points, or points obtained by adding predetermined fee points to the reward to be awarded may be set as the price points.

Referring again to FIG. 3, upon reception of a notification from the user terminal 20 of the live-streamer that the live-streamer starts a livestream over the network NW, the stream information providing unit 302 enters in the stream DB 314 a stream ID identifying this livestream and the live-streamer ID of the live-streamer who performs the livestream. When the stream information providing unit 302 receives a request to provide information about livestreams from the out-of-livestream communication unit 404 of a user terminal of an active user over the network NW, the stream information providing unit 302 retrieves currently available livestreams from the stream DB 314 and makes a list of currently available livestreams. The stream information providing unit 302 refers to an allocation DB 338 (later described) and identifies the gain-loss setting associated with the live-streamer of each livestream included in the list. The stream information providing unit 302 includes, in the list, information indicating the identified gain-loss setting, for example, a flag indicating whether it is a normal gain-loss setting or special gain-loss setting. The stream information providing unit 302 transmits the generated list to the requesting user terminal over the network NW. The out-of-livestream UI control unit 402 of the requesting user terminal generates a livestream selection screen based on the received list and shows the livestream selection screen on the display of the user terminal.

Once the out-of-livestream UI control unit 402 of the user terminal receives the active user's selection result of the livestream on the livestream selection screen, the out-of-livestream UI control unit 402 generates a stream request including the stream ID of the selected livestream, and transmits the stream request to the server 10 over the network NW. The stream information providing unit 302 starts to provide, to the requesting user terminal, the livestream identified by the stream ID included in the received stream request. The stream information providing unit 302 updates the stream DB 314 such that the user ID of the active user of the requesting user terminal is included in the viewer IDs for the stream ID. In this way, the active user can be a viewer of the selected livestream.

The relay unit 304 relays the video data from the streamer-side user terminal 20 to the viewer-side user terminal 30 in the livestream started by the stream information providing unit 302. The relay unit 304 receives from the viewer-side communication unit 204 a signal that represents user input by a viewer during the livestream or reproduction of the video data. The signal that represents user input may be an object specifying signal for specifying an object displayed on the display of the user terminal 30, and the object specifying signal includes the viewer ID of the viewer, the live-streamer ID of the live-streamer of the livestream that the viewer watches, and an object ID that identifies the object. When the object is a gift icon, the object ID is the gift ID. The object specifying signal in that case is a gift use signal indicating that the viewer uses a gift for the live-streamer. Similarly, the relay unit 304 receives from the streamer-side communication unit 110 of the streaming unit 100 in the user terminal 20 a signal that represents user input by the live-streamer during reproduction of the video data, such as the object specifying signal.

The gift processing unit 308 updates the user DB 318 so as to increase the reward for the live-streamer depending on the reward to be awarded of the gift identified by the gift ID included in the gift use signal. Specifically, the gift processing unit 308 refers to the gift DB 320 to specify a reward to be awarded for the gift ID included in the received gift use signal. The gift processing unit 308 then updates the user DB 318 to add the specified reward to be awarded to the reward for the live-streamer ID included in the gift use signal.

The payment processing unit 310 processes payment of a price of the gift by the viewer in response to reception of the gift use signal. Specifically, the payment processing unit 310 refers to the gift DB 320 to specify the price points of the gift identified by the gift ID included in the gift use signal. The payment processing unit 310 then updates the user DB 318 to subtract the specified price points from the points of the viewer identified by the viewer ID included in the gift use signal.

The game processing unit 330 performs processing related to the provision of a game in a live-stream. The game processing unit 330 includes a start request receiving unit 332, a normal instance 334, a special instance 336, an allocation DB 338, and an instance control unit 340.

In this embodiment, the game is provided as a single-player game, in which a viewer first selects one element from among a plurality of elements and puts some points. The game instance of the game processing unit 330 performs a lottery with a predetermined probability to determine a winning element from among the multiple elements. If the element selected by the viewer wins the lottery, the viewer wins; otherwise, the viewer loses. Each element is associated with a corresponding odds (multiplier). When the viewer wins, the viewer is awarded the number of points calculated by the points viewer has put (bet)×the odds. When the viewer loses, the viewer receives no points. The higher the odds of an element, the lower the probability of that element being drawn in the lottery. Such in-livestream games may be realized, for example, by the techniques described in the non-patent literature 1.

The instance control unit 340 generates multiple game instances with different gain-loss settings and controls them. In this embodiment, a normal instance 334 with a normal gain-loss setting and a special instance 336 with a special gain-loss setting are generated. Examples of the games are shown below.

<Game A>
Rules:
  A viewer selects one of an element A or an element B.
  The game instance selects one from the element A and element B as a winning element by drawing lots.

The probability of the element A being selected by the drawing lots is set to 0.7 and the probability of the element B being selected is set to 0.3.

The probability of the element A being selected by the viewer and the probability of the element B being selected by the viewer are assumed to be equal, i.e., 0.5 for each.

Normal Gain-Loss Setting:
The odds of the element A is set to 1.2 and the odds of the element B is set to 3.
Thus, the expected value is calculated as follows:

$$0.5\times0.7\times1.2+0.5\times0.3\times3=0.87$$

Special Gain-Loss Setting:
The odds of the element A is set to 1.4 and the odds of the element B is set to 3.2.
Thus, the expected value is calculated as follows:

$$0.5\times0.7\times1.4+0.5\times0.3\times3.2=0.97$$

In the case of the game A, by adjusting the odds, the expected value (0.97) of the special gain-loss setting is set greater than the expected value (0.87) of the normal gain-loss setting. Therefore, it can be said that the special gain-loss setting is more advantageous to the viewer than the normal gain-loss setting.

<Game B>
Rules:
A viewer selects one of an element C or an element D.
The game instance selects one from the element C and element D as a winning element by drawing lots.
The odds of the element C is set to 1.1 and the odds of the element D is set to 4.
The probability of the element C being selected by the viewer and the probability of the element D being selected by the viewer are assumed to be equal, i.e., 0.5 for each.

Normal Gain-Loss Setting:
The probability of the element C being selected by the drawing lots is set to 0.9 and the probability of the element D being selected is set to 0.1. Thus, the expected value is calculated as follows:

$$0.5\times0.9\times1.1+0.5\times0.1\times4=0.695$$

Special Gain-Loss Setting:
The probability of the element C being selected by the drawing lots is set to 0.8 and the probability of the element D being selected is set to 0.2. Thus, the expected value is calculated as follows:

$$0.5\times0.8\times1.1+0.5\times0.2\times4=0.84$$

In the case of the game B, by adjusting the probability of the element being selected, the expected value (0.84) of the special gain-loss setting is set greater than the expected value (0.695) of the normal gain-loss setting. Therefore, it can be said that the special gain-loss setting is more advantageous to the viewer than the normal gain-loss setting. As another example, there may be a game in which both the odds and the probability of the draw are adjusted using the gain-loss settings.

Game instances such as the normal instance 334 and special instance 336 may be realized using game instantiation techniques disclosed in, for example, Japanese Patent Application Publication (Translation of PCT Application) No. 2022-521348. The game instances in the embodiment have a common game logic and a common user interface, but are configured to have different parameters such as odds and probabilities. These parameters may be set by the administrator of the live-streaming platform.

FIG. 7 is a data structure diagram showing, as an example, the allocation DB shown in FIG. 3. The allocation DB 338 holds correspondence between the live-streamers and the gain-loss settings. The allocation DB338 holds the correspondence between the live-streamer' ID and the information indicating the gain-loss setting associated with the live-streamer. In the example of FIG. 7, the information indicating the gain-loss setting is "normal" for the normal gain-loss setting, "special" for the special gain-loss setting.

The allocation DB 338 may be updated by the administrator of the live-streaming platform. The administrator may update the contents of the allocation DB 338 so that new live-streamers who have not yet spent a predetermined period of time, e.g., one week, since they started live-streaming on the live-streaming platform are associated with the special gain-loss settings. After the update, the allocation DB 338 will hold the new live-streamers and the information indicating the special gain-loss settings in association with each other. In this case, the new live-streamers can be promoted because viewers are more likely to choose live-streams of the new live-streamers with favorable gain-loss settings. Alternatively, the administrator may also update the contents of the allocation DB 338 so that the special gain-loss settings are associated with event live-streamers who are selected in connection with a live-streaming event. After the update, the allocation DB 338 will hold the event live-streamers and the information indicating the special gain-loss settings in association with each other. In this case, viewers are more likely to choose live-streams of the event live-streamers with favorable gain-loss settings, which can attract more viewers to the event and promote the event live-streamers.

The example of FIG. 7 describes a case in which the allocation DB 338 holds the live-streamers IDs, but it is not limited to this. For example, it may hold stream IDs instead of the live-streamer IDs. In this case, the allocation DB 338 indirectly associates, via the stream ID, the live-streamer ID of the live-streamer performing the livestream identified by the stream ID with the type of the gain-loss setting.

Referring again to FIG. 3, the start request receiving unit 332 is configured to receive a request for start of a game (hereinafter referred to as "game start request") from the user terminal 30 of the viewer over the network NW. The viewer starts watching the livestream. While watching the livestream, the viewer inputs into the user terminal 30 an instruction to start a game. Upon reception of the instruction, the viewer-side communication unit 204 of the user terminal 30 generates a game start request including the streamer ID indicative of the live-streamer of the livestream the viewer is watching, and transmits the game start request to the server 10 over the network NW. The start request receiving unit 332 receives the game start request so transmitted.

The instance control unit 340, normal instance 334, and special instance 336 together constitute means for initiating, in response to receipt of the game start request by the start request receiving unit 332, provision of a game having the gain-loss setting corresponding to the live-streamer of the livestream being watched by the viewer to the viewer's user terminal 30 in the live-stream.

In response to receipt of the game start request by the start request receiving unit 332, the instance control unit 340 refers to the allocation DB 338 and identifies the gain-loss setting corresponding to the live-streamer of the livestream being watched by the viewer who sent the game start request. The instance control unit 340 extracts the live-streamer ID from the received game start request. The instance control unit 340 identifies the type of the gain-loss setting corresponding to the extracted live-streamer ID by referring to the allocation DB 338.

The instance control unit 340 causes a game instance corresponding to the gain-loss setting of the identified type to start to provide the game to the user terminal 30 of the viewer who sent the game start request. The instance control unit 340 selects the normal instance 334 when the normal gain-loss setting is identified, and selects the special instance 336 when the special gain-loss setting is identified. The instance control unit 340 causes the selected game instance to start to provide the game.

In the example of FIG. 7, when a game start request is sent from a viewer "USR1" in a livestream of a live-streamer "ABC", the instance control unit 340 identifies the normal gain-loss setting corresponding to the live-streamer "ABC" and thus selects the normal instance 334. The normal instance 334 starts to provide the game with the normal gain-loss setting to the user terminal of the viewer "USR1" in the livestream of the live-streamer "ABC". When a game start request is sent from the viewer "USR1" in a livestream of a live-streamer "DEF", the instance control unit 340 identifies the special gain-loss setting corresponding to the live-streamer "DEF" and thus selects the special instance 336. The special instance 336 starts to provide the game with the special gain-loss setting to the user terminal of the viewer "USR1" in the livestream of the live-streamer "DEF". As described above, when the same viewer "USR1" plays games in livestreams of different live-streamers, the instances that provide the games will be different between the different live-streamers, and the advantages of the games will be different.

Figure 8:
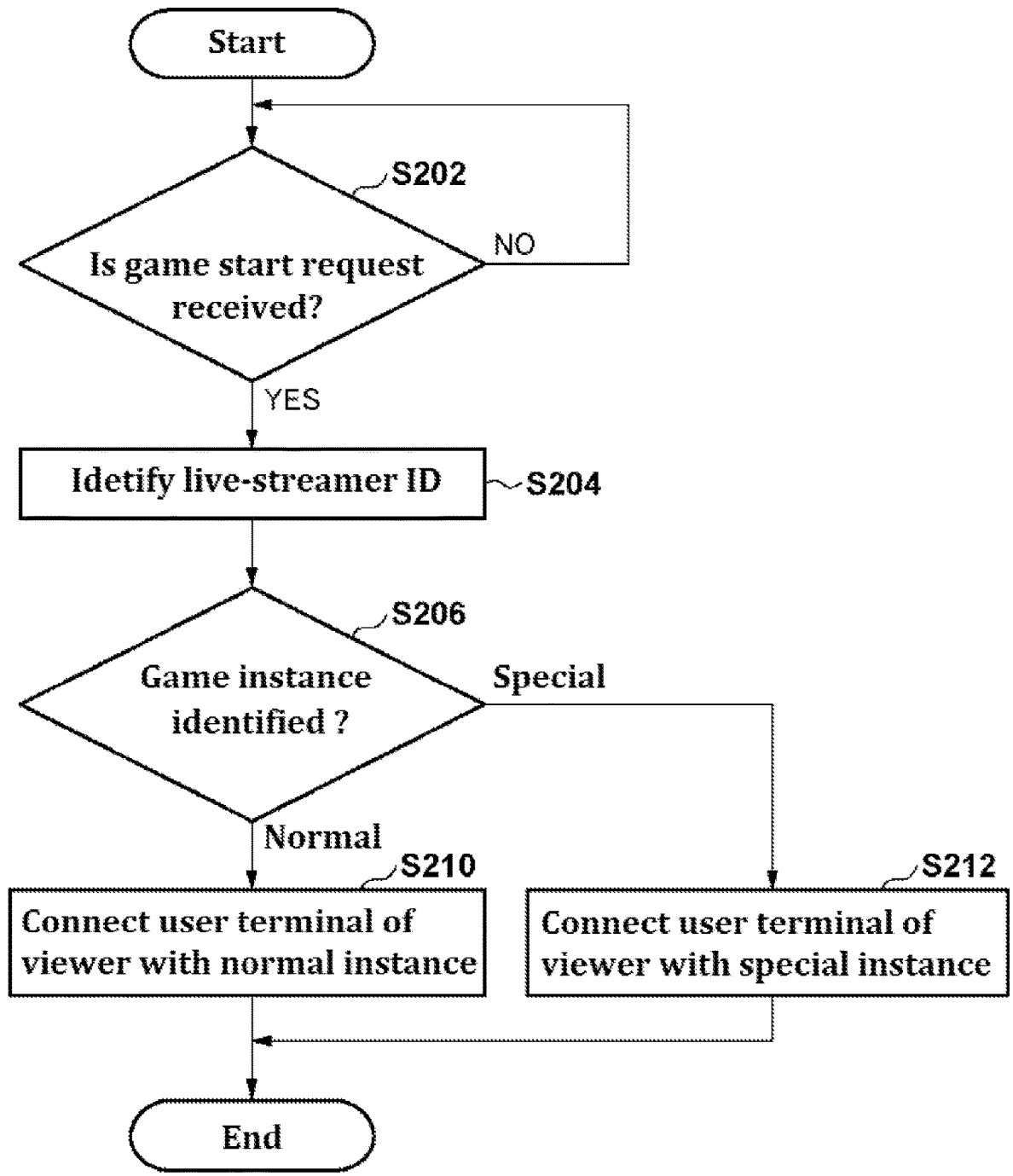
FIG. 8 is a flow chart showing a series of steps of a process performed in the live-streaming system when viewer's instruction to start a game is supplied during a livestream.

The operation of the livestreaming system 1 with the above configuration will be now described. FIG. 8 is a flow chart showing a series of steps of a process performed in the live-streaming system when viewer's instruction to start a game is supplied during a livestream. The server 10 waits for a game start request (S202). When the game start request is received (Y in S202), the server 10 identifies the live-streamer ID included in the game start request as the live-streamer ID of the live-streamer of the livestream being viewed by the requesting viewer (S204). The server 10 identifies the game instance corresponding to the identified live-streamer ID (S206). When the normal instance 334 is identified ("normal" in S206), the server 10 starts to provide a game with the normal gain setting by connecting the user terminal 30 of the requesting viewer with the normal instance 334 (S210). Whereas when the special instance 336 is identified ("special" in S206), the server 10 starts to provide a game with the special gain-loss setting by connecting the user terminal 30 of the requesting viewer with the special instance 336 (S212).

Figure 9:
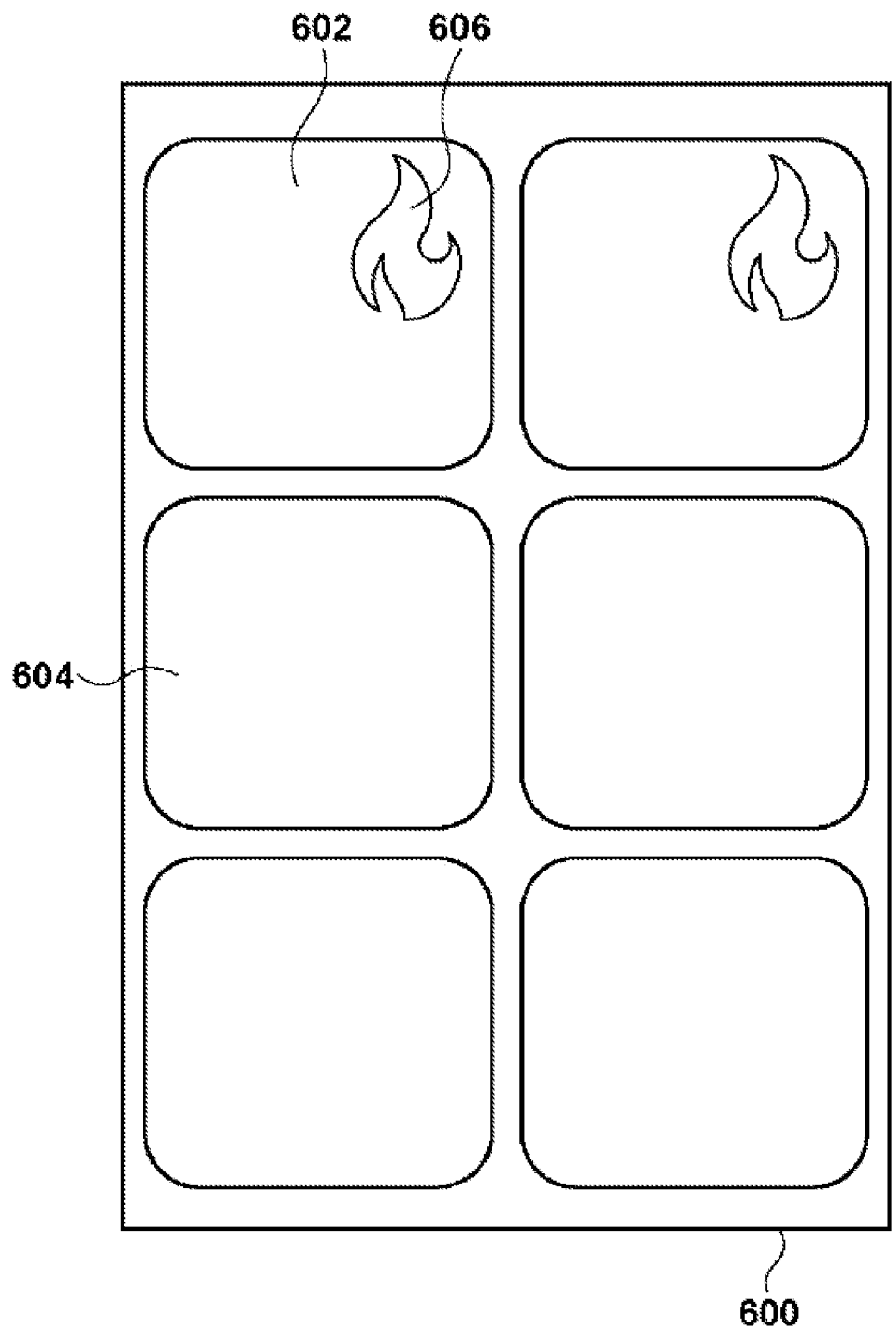
FIG. 9 is a representative screen image of a livestream selection screen on a user terminal display of an active user.

FIG. 9 is a representative screen image of a livestream selection screen on a user terminal display of an active user. The livestream selection screen 600 includes thumbnails 602 and 604 indicating livestreams in the list of currently available livestreams received from the server. The out-of-livestream UI control unit 402 generates the livestream selection screen 600 based on the list of live-streams obtained from the server 10 and shows the screen on the display. In the example of FIG. 9, the out-of-livestream communication unit 404 receives from the server 10 over the network NW a list of available live-streams including a first livestream associated with a game having the special gain-loss settings and a second livestream associated with a game having the normal gain-loss setting different from the special gain-loss settings. When displaying the thumbnails representing the live-streams included in the received list on the display, the out-of-livestream UI control unit 402 differentiates the style of the thumbnail 602 representing the first livestream from that of the thumbnail 604 representing the second livestream. More specifically, when a flag associated with a livestream included in the list indicates the special gain-loss setting, the out-of-livestream UI control unit 402 attaches a special setting badge 606 to the thumbnail 602 of that live-stream. When the flag indicates the normal gain-loss setting, the special setting badge 606 is not attached (see the thumbnail 604).

Thus, by making the thumbnail 602 of the first livestream that offers a game with the special gain-loss setting stand out from the thumbnail 604 of the second livestream that offers a game with the normal gain-loss setting, active users can easily find the first livestream. This can increase the effectiveness of the promotion of the live-streamer through the special gain-loss setting.

In lieu of or in addition to granting of the special setting badge 606, the thumbnail 602 of the first livestream may be placed at position attracting more attention, e.g., at the top of the screen, than the thumbnail 604 of the second livestream on the livestream selection screen 600. In this case, the live-streaming platform may further promote a live-streamer (s) who can offer a game with the special gain-loss setting.

Figure 10:
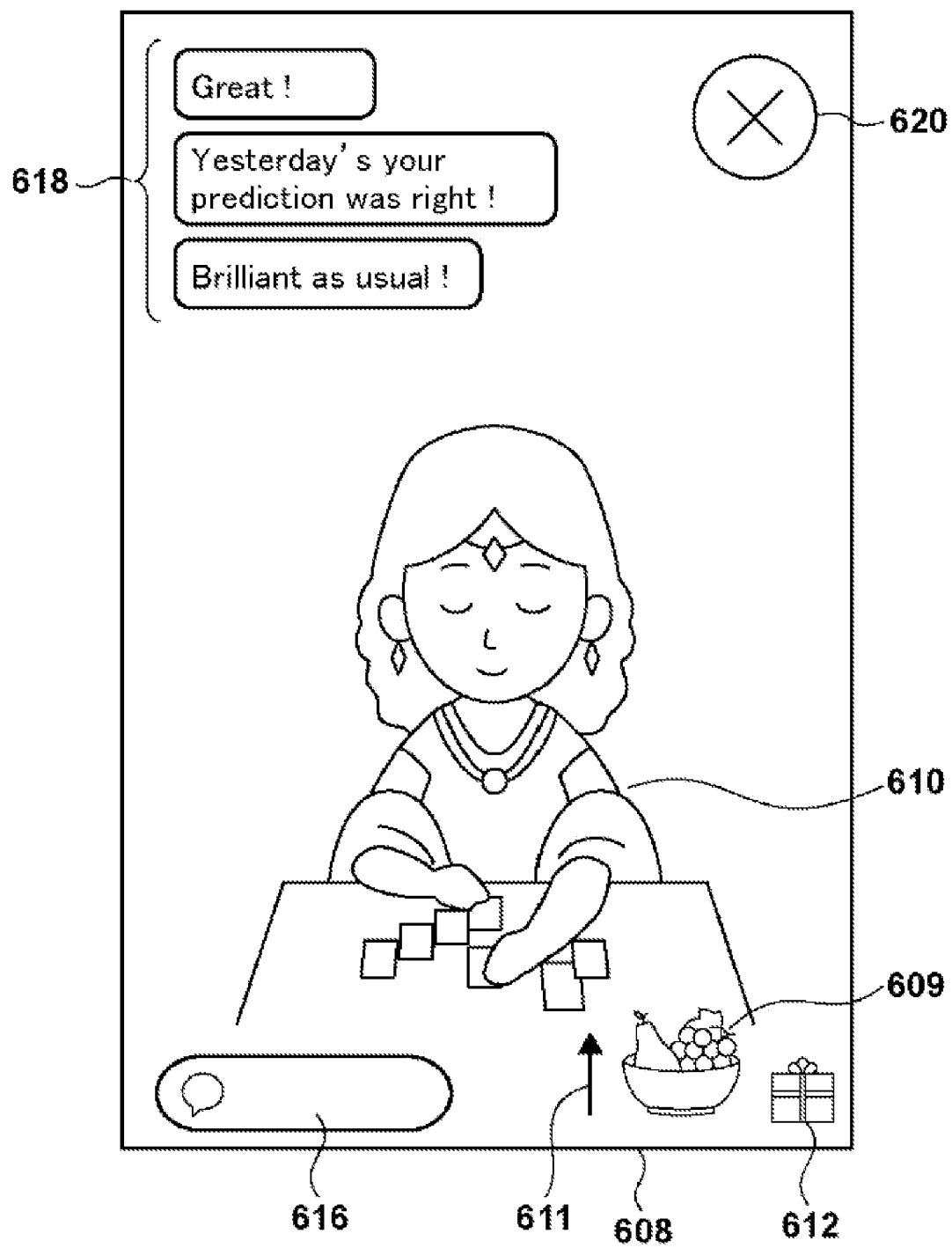
FIG. 10 is a representative screen image of a live-streaming room screen on a display of a viewer's user terminal.

FIG. 10 is a representative screen image of a livestreaming room screen 608 shown on the display of the viewer's user terminal 30. Once the viewer taps the thumbnail 602 on the livestream selection screen 600 of FIG. 9, the live-streaming room screen 608 of FIG. 10 is shown on the display. The livestreaming room screen 608 displays a video image generated by the user terminal 20 of the live-streamer in real time. The live-streaming room screen 608 includes a video image 610 of a distributor obtained by reproducing the video data received from the server 10, a gift object 612, a comment input region 616, a comment display region 618, a quit viewing button 620, a game object 609, and a special setting indicator 611. The viewer-side UI control unit 202 superimposes other objects such as the gift object 612, the comment input region 616, the comment display region 618, the quit viewing button 620, the game object 609, and the special setting indicator 611 on the video image 610 obtained by reproducing the video data to generate the live-streaming room screen 608.

The comment display region 618 may include a comment entered by the viewer and comments entered by other viewers, and notifications from the system. The notifications from the system include information but who gave which gift to the distributor. The viewer-side UI control unit unit 202 generates the comment display region 618 including comments of other viewers and received from the server 10 and notifications from the system, and the viewer-side UI control unit 202 includes the generated comment display region 618 in the live-streaming room screen 608.

The comment input region 616 receives a comment input by the viewer. The viewer-side communication unit 204 generates a comment input signal that includes the comment entered in the comment input region 616, and transmits the signal to the server 10 over the network NW. At the same time, the viewer-side UI control unit 202 updates the comment display region 618 to display the comment entered in the comment input region 616.

The quit viewing button 620 is an object for accepting an instruction from the viewer to quit viewing the live-stream.

The game object 609 is an object for receiving an instruction to start a game from the viewer while the viewer is watching the livestream.

The special setting indicator 611 is displayed when the live-streamer of the livestream is associated with the special gain-loss setting. The special setting indicator 611 is not displayed when the live-streamer is associated with the normal gain-loss setting. By the presence or absence of the special setting indicator 611, the viewer can easily tell whether the game that can be played through the livestream that the viewer is currently watching has the special gain-loss setting or the normal gain-loss setting.

The viewer taps the game object 609 while watching the livestream. On detection of the tap on the game object 609, the viewer-side UI control unit 202 of the user terminal 30 receives it as an instruction to start the game. On reception of the instruction, the viewer-side communication unit 204 of the user terminal 30 generates the above-described game start request and transmits the game start request to the server 10 over the network NW. The instance control unit 340 of the server 10 causes the special instance 336 to start to provide the game to the viewer's user terminal 30 in response to receipt of the game start request. The viewing-side UI control unit 202 of the user terminal 30 generates a game region 622 based on the game data received from the special instance 336. The viewer-side UI control unit 202 superimposes the generated game region 622 on the live-streaming room screen 608.

Figure 11:
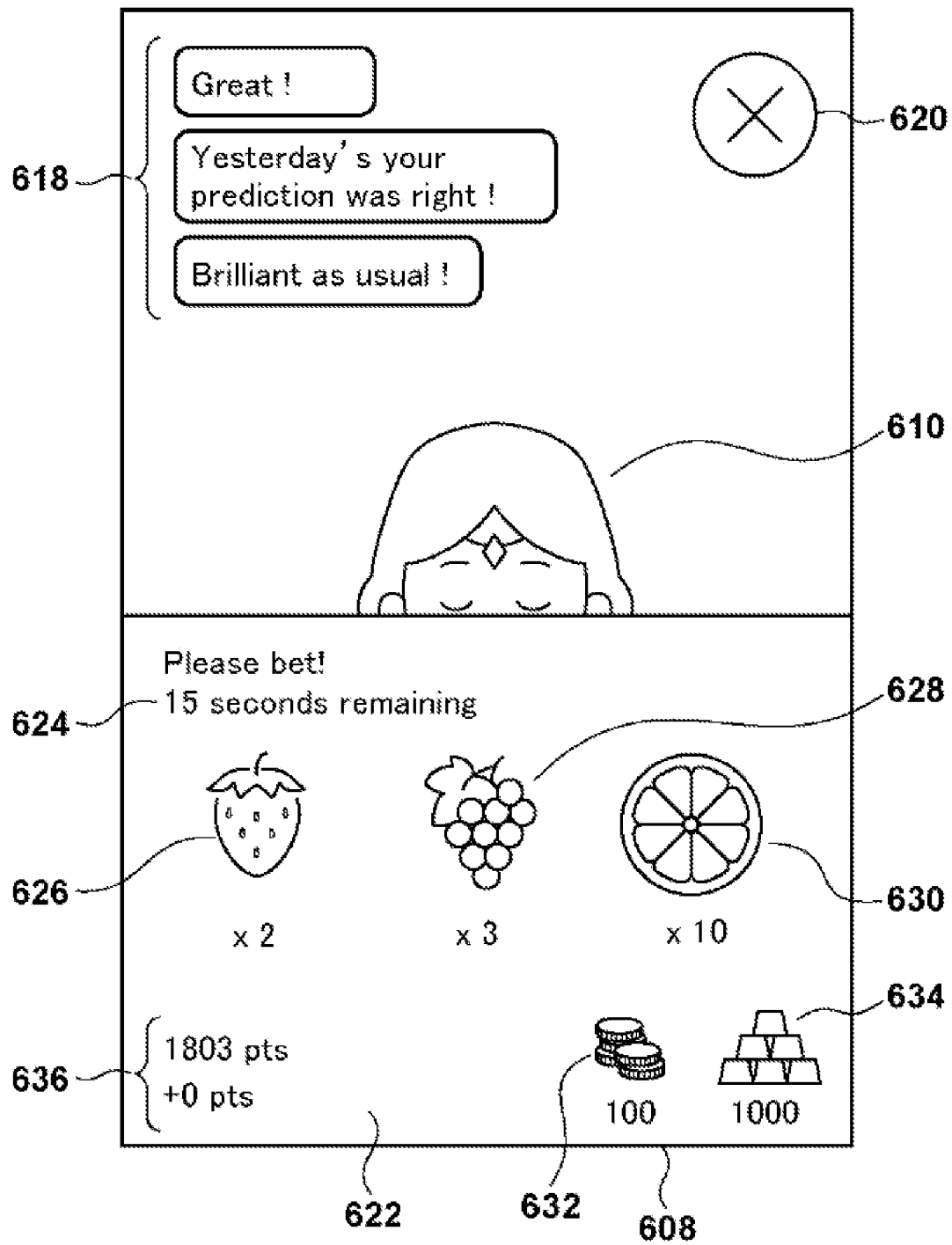
FIG. 11 is a representative screen image of the live-streaming room screen having a game region superimposed thereon, which is shown on the display of the viewer's user terminal.

FIG. 11 is a representative screen image of the livestream room screen 608 on which the game region 622 is superimposed on the display of the viewer's user terminal 30. The game region 622 is a popup dialog superimposed on the livestream room screen 608. The game region 622 has a remaining time region 624 showing the time remaining in a current round of the game, three different elements 626, 628, 630 respectively associated with corresponding odds, a low bet object 632, a high bet object 634, and a point display region 636 showing the points currently owned by the viewer, who is the player, and the current total profit/loss for that viewer.

The viewer taps one of the three elements 626, 628 and 630 to bet some points on the tapped element. Alternatively, the viewer may drag and drop the low bet object 632 or high bet object 634 on a desired one of the elements to bet some points on the desired element. Upon expiration of the duration of the current round of the game, the special instance 336 draws lots to determine the winning element from the three elements 626, 628 and 630.

Figure 12:
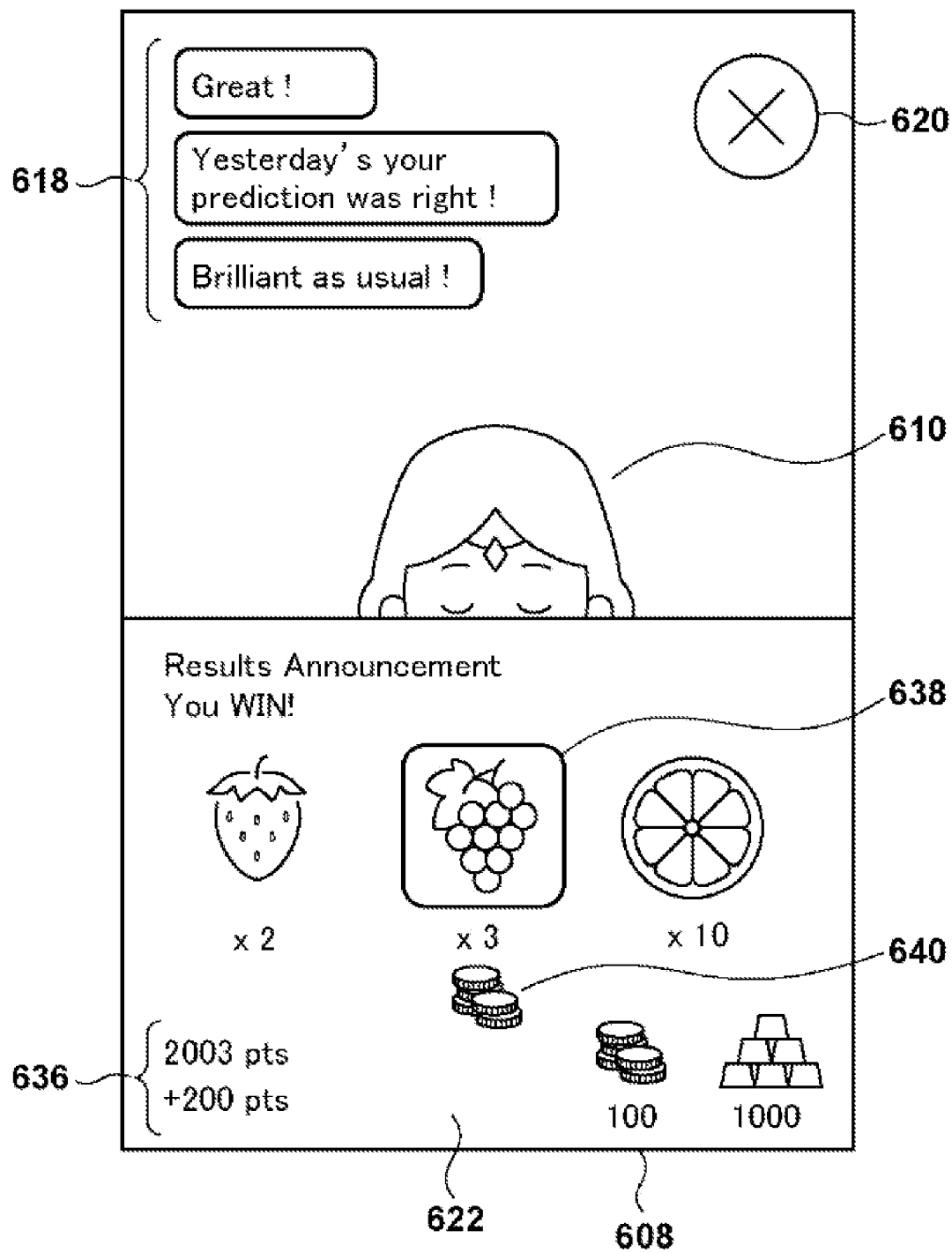
FIG. 12 is a representative screen image of the live-streaming room screen having the game region superimposed thereon, which is shown on the display of the viewer's user terminal.

FIG. 12 is a representative screen image of the livestream room screen 608 on which the game region 622 is superimposed on the display of the viewer's user terminal 30. FIG. 12 shows the case where the viewer has won in the round of the game shown in FIG. 11. The viewer makes a bet by dragging and dropping the low bet object 632 on the element 628 (grape), and the special instance 336 draws lots to determine the element 628 as the winning element. In the game region 622, an object 640 indicates the viewer's bet, and a frame 638 indicates the winning element 628. The special instance 336 determines that the viewer has won at odds of 3 and performs necessary processes (e.g., updates the user DB 318) to refund (−100)+(100×3)=+200 points to the viewer. The point display region 636 in FIG. 12 reflects the results of the refund.

In the above embodiment, an example of a holding unit includes a hard disk or semiconductor memory. It is understood by those skilled in the art that each element or component can be realized by a CPU not shown, a module of an installed application program, a module of a system program, or a semiconductor memory that temporarily stores the contents of data read from a hard disk, and the like.

According to the live-streaming system 1, for games that are playable in live-streams, it is possible to associate a predetermined live-streamer(s) with the special gain-loss setting that is more advantageous to viewers than the normal gain-loss setting. In this way, the predetermined live-streamer(s) can be promoted. For example, by assigning the special gain-loss setting(s) to new live-streamers or live-streamers participating in an event, it is possible to attract more viewers to the new live-streamers to get their live-streaming on track or to make the event more exciting.

Figure 13:
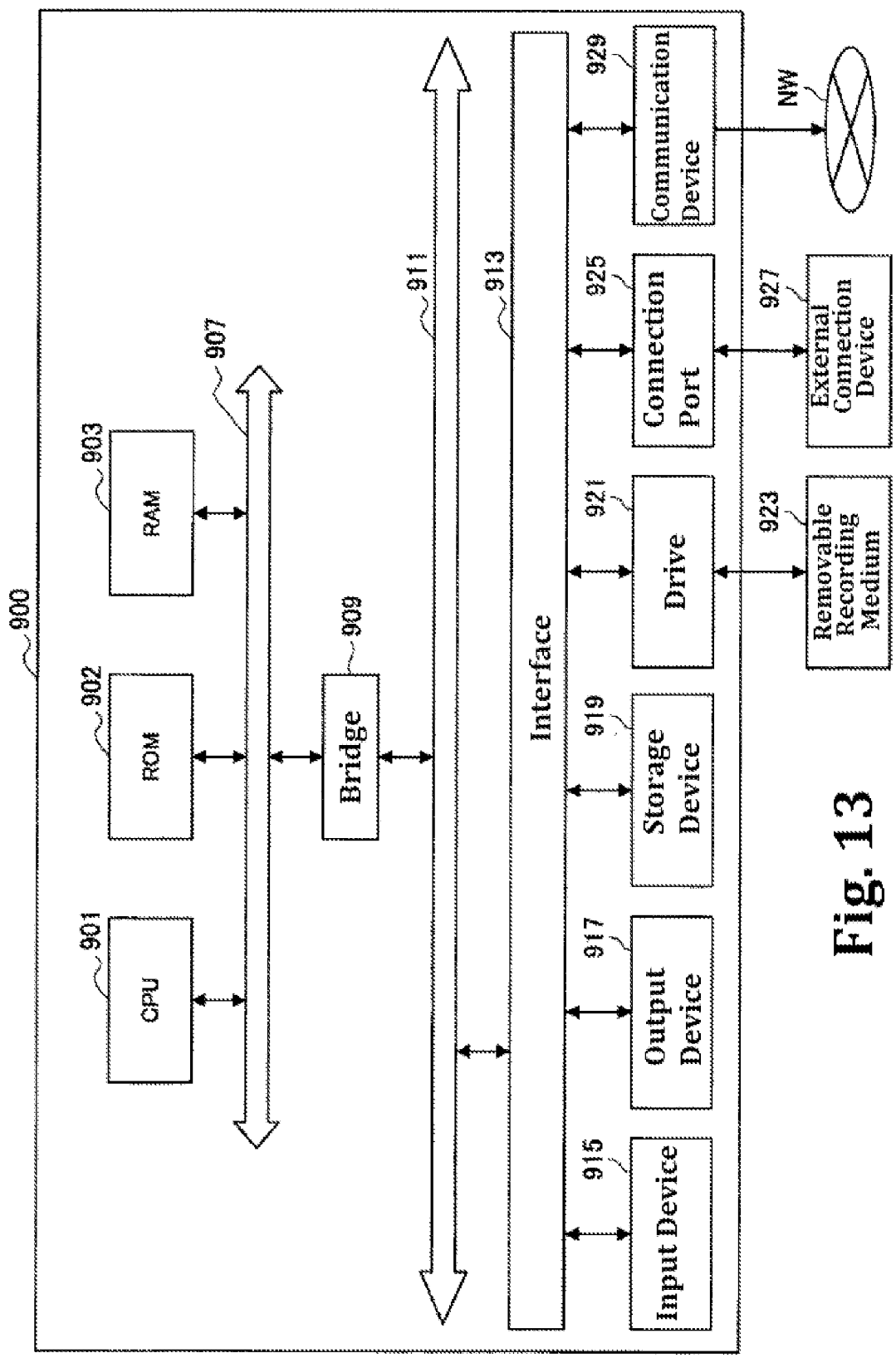
FIG. 13 is a block diagram showing an example of a hardware configuration of the information processing device according to the embodiment.

Referring to FIG. 13, the hardware configuration of an information processing device relating to an embodiment of the disclosure will be now described. FIG. 13 is a block diagram showing an example of the hardware configuration of the information processing device according to the embodiment. The illustrated information processing device 900 may, for example, realize the server 10 and the user terminals 20 and 30 in the embodiment.

The information processing device 900 includes a CPU 901, ROM (Read Only Memory) 902, and RAM (Random Access Memory) 903. The information processing device 900 may also include a host bus 907, a bridge 909, an external bus 911, an interface 913, an input device 915, an output device 917, a storage device 919, a drive 921, a connection port 925, and a communication device 929. In addition, the information processing device 900 includes an image capturing device such as a camera (not shown). In addition to or instead of the CPU 901, the information processing device 900 may also include a processing circuit such as a DSP (Digital Signal Processor) or ASIC (Application Specific Integrated Circuit).

The CPU 901 functions as an arithmetic processing device and a control device, and controls all or some of the operations in the information processing device 900 according to various programs stored in the ROM 902, the RAM 903, the storage device 919, or a removable recording medium 923. For example, the CPU 901 controls the overall operation of each functional unit included in the server 10 and the user terminals 20 and 30 in the embodiment. The ROM 902 stores programs @including sets of instructions@, calculation parameters, and the like used by the CPU 901. The RAM 903 serves as a primary storage that stores @programs including sets of instructions@ to be used in the execution of the CPU 901, parameters that appropriately change in the execution, and the like. The CPU 901, ROM 902, and RAM 903 are interconnected to each other by the host bus 907 which may be an internal bus such as a CPU bus. Further, the host bus 907 is connected to the external bus 911 such as a PCI (Peripheral Component Interconnect/Interface) bus via the bridge 909.

The input device 915 may be a user-operated device such as a mouse, keyboard, touch panel, buttons, switches and levers, or a device that converts a physical quantity into an electric signal such as a sound sensor typified by a microphone, an acceleration sensor, a tilt sensor, an infrared sensor, a depth sensor, a temperature sensor, a humidity sensor, and the like. The input device 915 may be, for example, a remote control device utilizing infrared rays or other radio waves, or an external connection device 927 such as a mobile phone compatible with the operation of the information processing device 900. The input device 915 includes an input control circuit that generates an input signal based on the information inputted by the user or the detected physical quantity and outputs the input signal to the CPU 901. By operating the input device 915, the user inputs various data and instructs operations to the information processing device 900.

The output device 917 is a device capable of visually or audibly informing the user of the obtained information. The output device 917 may be, for example, a display such as an LCD, PDP, or OELD, etc., a sound output device such as a speaker and headphones, and a printer. The output device 917 outputs the results of processing by the information processing device 900 as text, video such as images, or sound such as audio.

The storage device 919 is a device for storing data configured as an example of a storage unit of the information processing device 900. The storage device 919 is, for example, a magnetic storage device such as a hard disk drive (HDD), a semiconductor storage device, an optical storage device, or an optical magnetic storage device. This storage device 919 stores programs executed by the CPU 901, various data, and various data obtained from external sources.

The drive 921 is a reader/writer for the removable recording medium 923 such as a magnetic disk, an optical disk, a photomagnetic disk, or a semiconductor memory, and is built in or externally attached to the information processing device 900. The drive 921 reads information recorded in the mounted removable recording medium 923 and outputs it to the RAM 903. Further, the drive 921 writes record in the attached removable recording medium 923.

The connection port 925 is a port for directly connecting a device to the information processing device 900. The connection port 925 may be, for example, a USB (Universal Serial Bus) port, an IEEE1394 port, an SCSI (Small Computer System Interface) port, or the like. Further, the connection port 925 may be an RS-232C port, an optical audio terminal, an HDMI (registered trademark) (High-Definition Multimedia Interface) port, or the like. By connecting the external connection device 927 to the connection port 925, various data can be exchanged between the information processing device 900 and the external connection device 927.

The communication device 929 is, for example, a communication interface formed of a communication device for connecting to the network NW. The communication device 929 may be, for example, a communication card for a wired or wireless LAN (Local Area Network), Bluetooth (trademark), or WUSB (Wireless USB). Further, the communication device 929 may be a router for optical communication, a router for ADSL (Asymmetric Digital Subscriber Line), a modem for various communications, or the like. The communication device 929 transmits and receives signals and the like over the Internet or to and from other communication devices using a predetermined protocol such as TCP/IP. The communication network NW connected to the communication device 929 is a network connected by wire or wirelessly, and is, for example, the Internet, home LAN, infrared communication, radio wave communication, satellite communication, or the like. The communication device 929 realizes a function as a communication unit.

The image capturing device (not shown) is, for example, a camera for capturing an image of the real space to generate the captured image. The image capturing device uses an imaging element such as a CCD (Charge Coupled Device) or CMOS (Complementary Metal Oxide Semiconductor) and various elements such as lenses that are provided to control image formation of a subject on the imaging element. The image capturing device may capture a still image or may capture a moving image.

The configuration and operation of the live-streaming system 1 in the embodiment have been described. This embodiment is merely an example, and it will be understood by those skilled in the art that various modifications are possible by combining the respective components and processes, and that such modifications are also within the scope of the present disclosure.

Figure 14A:
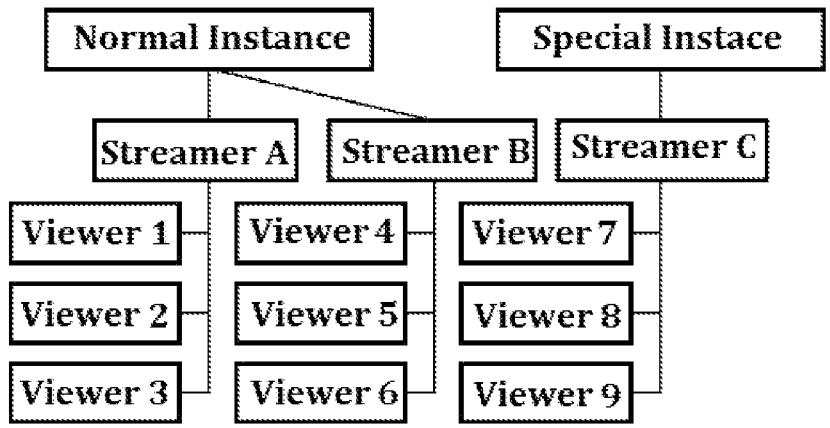
FIGS. 14A to 14E are schematic diagrams showing examples of a game instance configuration.

In the above embodiment, the case where there is the normal instance 334 with the normal gain-loss setting and the special instance 336 with the special gain-loss setting has been described, but the embodiment is not limited to this. For example, there are three or more game instances with different gain-loss settings. The case where live-streamers are associated with gain-loss settings has been described in the above embodiment, but the embodiment is not limited to this case. FIGS. 14A to 14E are schematic diagrams showing examples of a game instance configuration. FIG. 14A shows the game instance configuration according to the embodiment. Two game instances, the normal instance 334 and special instance 336, are preconfigured, and each live-streamer is associated with one of those two game instances. There is no relation between the types of game instance and the viewers, and the viewers play a game through the game instance associated with the live-streamer of the livestream they are watching.

Figure 14B:
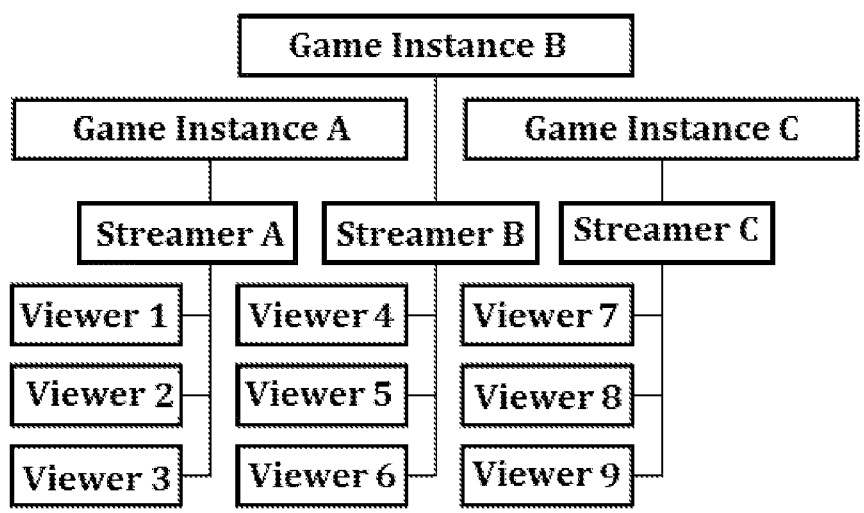

FIG. 14B illustrates a first modification example of the game instance configuration. In the first modification example, a game instance is set up for each live-streamer. In this example, there is a one-to-one correspondence between live-streamers and game instances. In this case, as the number of live-streamers increases, the number of game instances also increases, which may increase the load on the server, however it allows each live-streamer to use its own gain-loss setting, increasing the flexibility of game settings. In addition, the game can be personalized for each live-streamer, making it easier to appeal to viewers with features of the live-streamers.

Figure 14C:
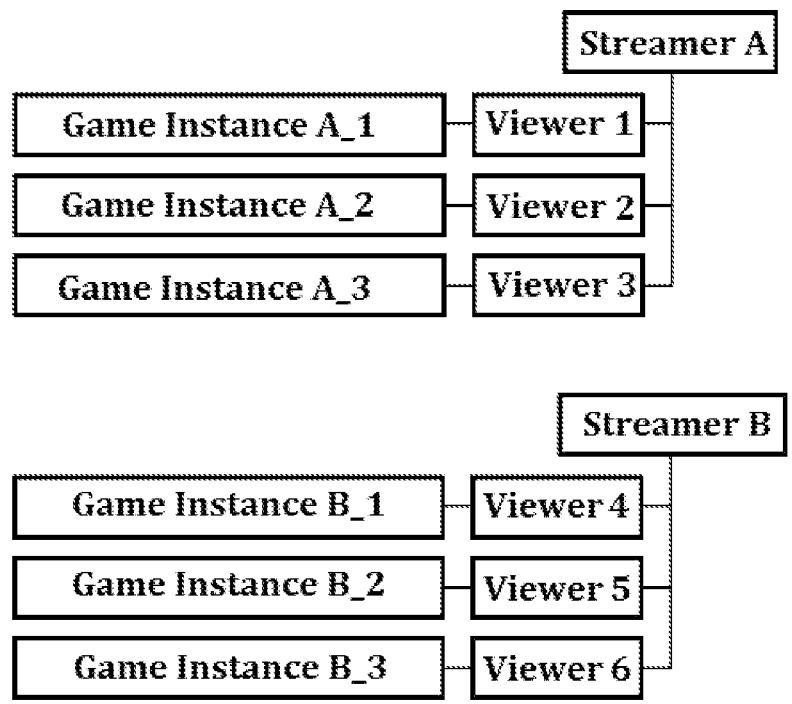

FIG. 14C illustrates a second modification example of the game instance configuration. In the second modification example, a game instance is set for each pair of live-streamer and viewer.

Figure 14D:
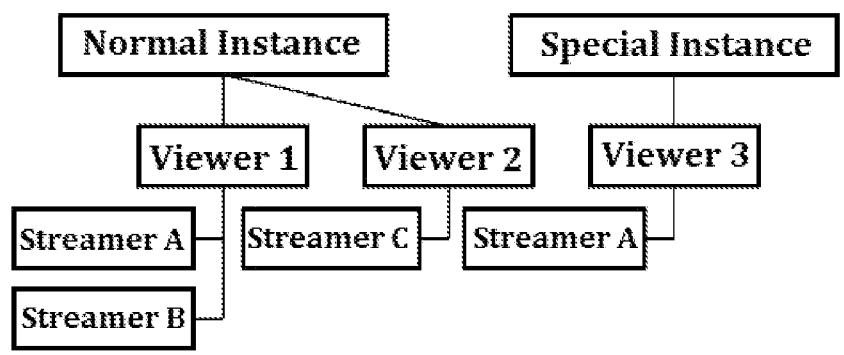

FIG. 14D illustrates a third modification example of the game instance configuration. In the third modification example, two game instances, the normal instance and the special instance, are set in advance, and each viewer is associated with one of these two game instances. There is no relation between the types of game instance and the live-streamers, and the viewer plays a game through the game instance associated with the viewer, regardless of the live-streamer of the livestream the viewer is watching. In this case, it is possible to give preference certain viewers such as new viewers in the game, and to increase the service retention rate of the viewers. The same advantageous effects can be obtained for the case of FIG. 14C.

Figure 14E:
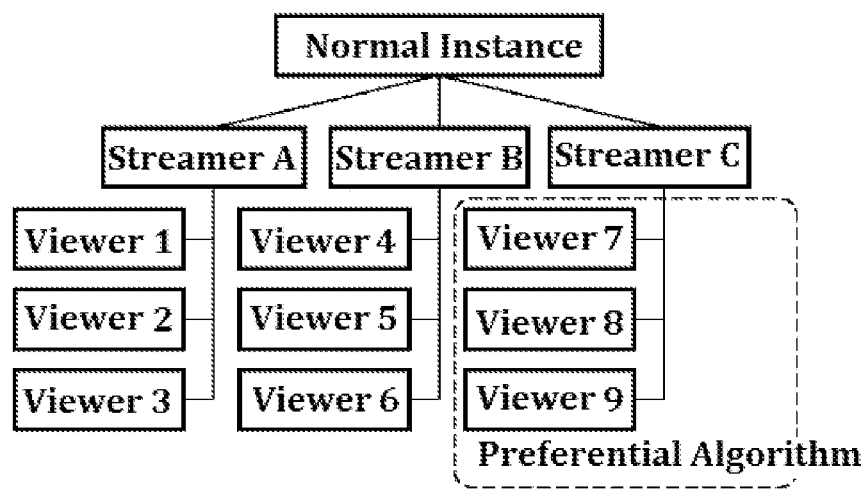

FIG. 14E illustrates a fourth modification example of the game instance configuration. In the fourth modification example, only one normal game instance is provided. The system has a preferential algorithm and a list of live-streamers to whom the preferential algorithm is applied. In the example of FIG. 14E, a "live-streamer C" is subjected to the preferential algorithm, and thus the preferential algorithm is applied to the game played in the livestream by the viewers ("viewer 7", "viewer 8" and "viewer 9") who are watching the livestream of the "live-streamer C". The preferential algorithm may include, for example, providing extra points when a viewer wins a game, or subsidizing the viewer's bet by half the amount by the system.

In the embodiment, the case in which a single-player game is played in a livestream has been described. However the technical ideas of the embodiment can be also applied to cases in which other types of games are played. For example, when competitive or multiplayer games are provided in the live-stream, the gain-loss settings of such games may be adjusted for each live-streamer. Examples of such games include games in which multiple viewers compete with each other, games in which one or more viewers compete with the live-streamer (blackjack, poker, rock-paper-scissors, etc.), games in which multiple live-streamers compete with each other, or games in which multiple live-streamers and multiple viewers compete with each other.

In the embodiment, the case in which a viewer first participates in a livestream and then makes a request to start a game in the livestream has been described, but the embodiment is not limited to this. For example, in a game livestream such as the live game described in the non-patent literature 2, a request by a viewer to participate in a livestream also serves as a request by the viewer to start a game. The technical ideas of the embodiment can also be applied to such a case.

In the embodiment, if the total points spent by the viewer in the game exceeds the total points returned to the viewer, a digital item having a value equal to the difference in points may be given to the viewer.

In the above embodiment, the case in which the administrator generates the normal gain-loss setting and special gain-loss setting has been described. However, the embodiment is not limited to this. For example, these settings may be adjusted automatically depending on attributes and past performances of live-streamers. For example, the special gain-loss settings may be derived from a function that takes as a variable at least one selected from the group consisting of: level of the live-streamer, livestream duration, total live-streaming time, viewed duration, earned points, number of comments received, and participation in events. Alternatively, in a modification example where a game instance is generated for each live-streamer, the gain-loss setting of the game instance may be variable depending on the attribute and track record of the live-streamer at that time. Alternatively, in a modification example where a game instance is generated for each viewer, the gain-loss setting may be automatically adjusted depending on the attribute and track record of the viewer.

In the above embodiment, the case in which the administrator determines correspondence between the live-streamers and the gain-loss settings has been described. However the embodiment is not limited to this. For example, a live-streamer to be associated with the special gain-loss setting may be randomly selected, or a gain-loss setting may be randomly determined for each live-streamer. In this case, the allocation DB 338 holds correspondence between a live-streamer and one of a plurality of different gain-loss settings randomly determined. In this example, viewers will watch many live-streams in search of more favorable gain-loss settings, which can promote viewer migration behavior.

In the above embodiment, there may be a special gift that has the effect of associating a livestream with a special gain-loss setting or changing the gain-loss setting to a more favorable setting for the viewer. It is envisioned that an enthusiastic viewer may use the special gift to activate a livestream of a favored live-streamer. In this example, the instance control unit 340 receives a gift use signal corresponding to the use of the special gift from the viewer's user terminal 30. The payment processing unit 310 completes a payment process by the giver viewer in response to the receipt of the gift use signal. When the payment process is completed, the instance control unit 340 updates the allocation DB 338 so that the special gain-loss setting is associated with the live-streamer to whom the special gift has been given. The instance control unit 340 causes the game provision through the special instance 336 to start in the livestream of the live-streamer to whom the special gift has been given.

The return rate of the gift, which indicates the ratio of the reward to be awarded to the price points points in the embodiment is merely an example, and the return rate may be appropriately set by the administrator of the live-streaming system 1, for example.

The technical idea according to the embodiment may be applied to live commerce or virtual live-streaming using an avatar that moves in synchronization with the movement of the streamer instead of the image of the streamer.

The procedures described herein, particularly those described with a flow diagram or a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present invention.

At least some of the functions realized by the server 10 may be realized by a device(s) other than the server 10, for example, the user terminals 20 and 30. At least some of the functions realized by the user terminals 20 and 30 may be realized by a device(s) other than the user terminals 20 and 30, for example, the server 10. For example, the superimposition of a predetermined frame image on an image of the video data performed by the viewer's user terminal may be performed by the server 10 or may be performed by the streamer's user terminal.

What is claimed is:

1. A server configured to provide a game, the game being playable in a livestream and involving gaining or losing points, comprising:
   a relay unit adapted to transmit a video data related to the livestream from a terminal of a live-streamer to a terminal of a viewer;
   a receiving unit adapted to receive a start request for the game from the terminal of the viewer over a network; and
   a starting unit adapted to start to provide the game in the livestream to the terminal of the viewer in response to reception of the start request, the game having a gain-loss setting corresponding to the live-streamer of the livestream,
   wherein the points are used to give a gift during the livestream from the viewer to the live-streamer.

2. The server of claim 1, further comprising:
   a holding unit adapted to hold correspondence between live-streamers and gain-loss settings; and
   an identifying unit adapted to identify, in response to reception of the start request, the gain-loss setting corresponding to the live-streamer of the live-stream that the viewer who has sent the start request is watching,
   wherein the starting unit starts to provide the game with the identified gain-loss setting.

3. The server of claim 2, wherein the holding unit holds correspondence between a predetermined live-streamer with a predetermined gain-loss setting, the predetermined gain-loss setting is more advantageous to the viewer than other normal gain-loss settings.

4. The server of claim 3, wherein the predetermined live-streamer includes a live-streamer who has not yet spent a predetermined period of time since the live-streamer started live-streaming.

5. The server of claim 3, wherein the predetermined live-streamer includes a live-streamer who is selected in connection with a live-streaming event.

6. The server of claim 2, wherein the holding unit holds correspondence between the live-streamer and one of a plurality of different gain-loss settings randomly determined.

7. A method performed at a server configured to provide a game, the game being playable in a livestream and involving gaining or losing points, comprising:
    relaying a video data related to a livestream from a terminal of a live-streamer to a terminal of a viewer;
    receiving a start request for a game from the terminal of the viewer over a network; and
    starting to provide the game in the livestream to the terminal of the viewer in response to reception of the start request, the game having a gain-loss setting corresponding to the live-streamer of the livestream,
    wherein the points are used to give a gift during the livestream from the viewer to the live-streamer.

8. The method of claim 7, further comprising: holding correspondence between live-streamers and gain-loss settings; and identifying, in response to reception of the start request, the gain-loss setting corresponding to the live-streamer of the live-stream that the viewer who has sent the start request is watching, wherein the starting includes starting to provide the game with the identified gain-loss setting.

9. The method of claim 8, wherein the holding includes holding correspondence between a predetermined live-streamer with a predetermined gain-loss setting, the predetermined gain-loss setting is more advantageous to the viewer than other normal gain-loss settings.

10. The method of claim 9, wherein the predetermined live-streamer includes a live-streamer who has not yet spent a predetermined period of time since the live-streamer started live-streaming.

11. The method of claim 9, wherein the predetermined live-streamer includes a live-streamer who is selected in connection with a live-streaming event.

12. The method of claim 8, wherein the holding includes holding correspondence between the live-streamer and one of a plurality of different gain-loss settings randomly determined.

13. A method performed at a server configured to provide a game, the game being playable in a livestream and involving gaining or losing points, comprising:
    relaying a video data related to a livestream from a terminal of a live-streamer to a terminal of a viewer;
    receiving a start request for a game from the terminal of the viewer over a network;
    starting to provide the game in the livestream to the terminal of the viewer in response to reception of the start request, the game having a gain-loss setting corresponding to the live-streamer of the livestream;
    holding correspondence between live-streamers and gain-loss settings; and
    identifying, in response to reception of the start request, the gain-loss setting corresponding to the live-streamer of the live-stream that the viewer who has sent the start request is watching,
    wherein the starting includes starting to provide the game with the identified gain-loss setting.

* * * * *